INVENTOR:
ERWIN M. ROSCHKE
BY Francis W. Crotty
HIS ATTORNEY.

Oct. 8, 1957 E. M. ROSCHKE 2,809,231

SUBSCRIBER TELEVISION SYSTEM

Filed Nov. 9, 1951 2 Sheets-Sheet 2

INVENTOR:
ERWIN M. ROSCHKE
BY Francis W. Crotty
HIS ATTORNEY.

United States Patent Office 2,809,231

Patented Oct. 8, 1957

2,809,231

SUBSCRIBER TELEVISION SYSTEM

Erwin M. Roschke, Des Plaines, Ill., assignor to Zenith Radio Corporation, a corporation of Illinois Application November 9, 1951, Serial No. 255,559

15 Claims. (Cl. 178—5.1)

Figure 1:
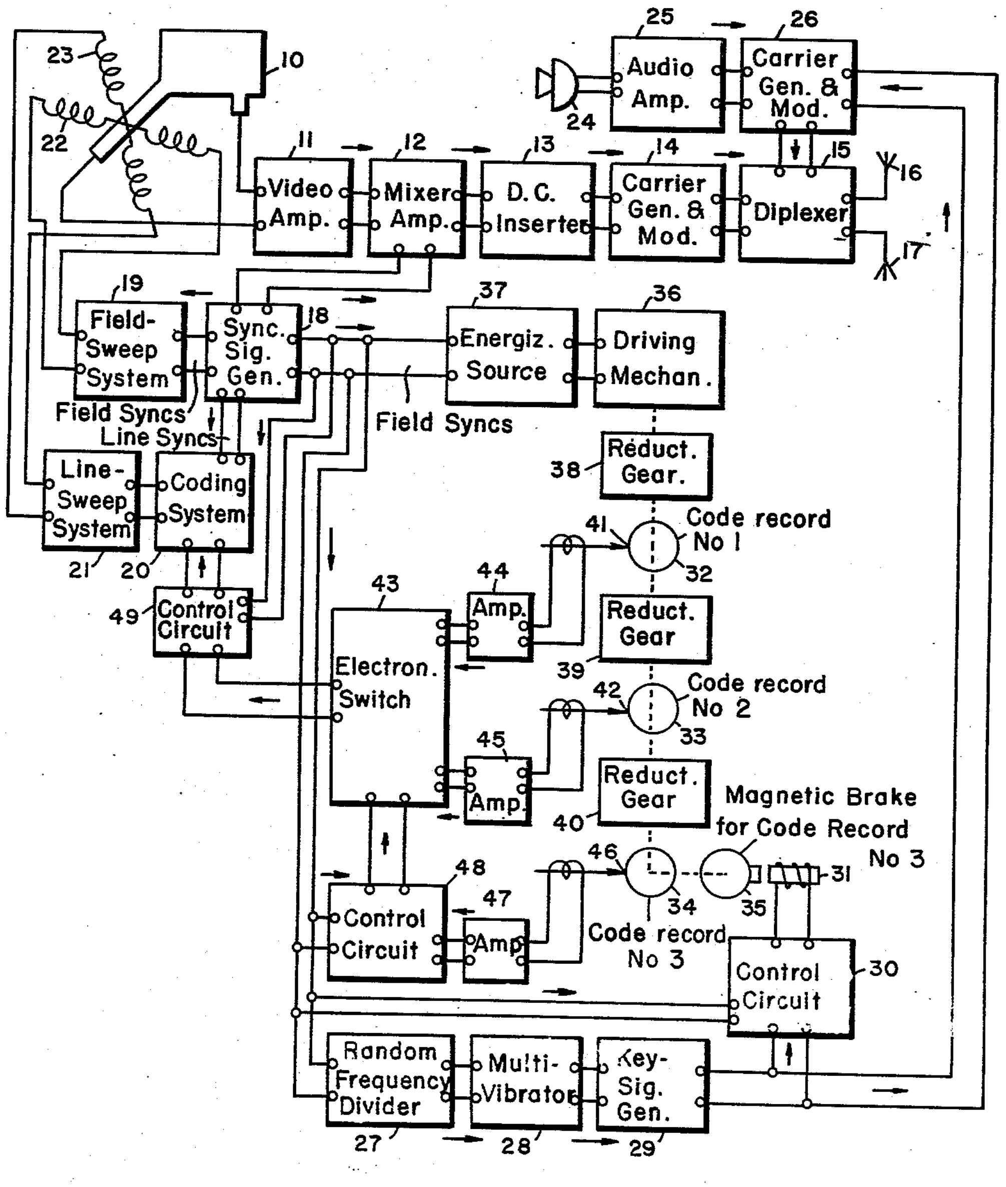

This invention relates to subscription television systems in which a television signal is transmitted in coded form to subscriber receivers equipped with suitable decoding apparatus for enabling such receivers to utilize the coded signal.

Since the invention may be practiced in either a transmitter or receiver, the term "encoding" has been used herein in its generic sense to encompass either coding at the transmitter or decoding at the receiver.

Coding of the television signal is usually effected by apparatus which responds to an actuating signal and changes the mode of operation of the transmitter in accordance with a coding schedule established by the actuating signal. The actuating signal may be produced by the recurrent scansion of a code record having selected coding information recorded thereon. The code record may take any of a variety of forms such as a magnetic tape or disc to be recurrently scanned by a pick-up head, or it may comprise an apertured card or a storage electrode to be read by a scanning beam. In some subscription systems a similar code record having information identical to that controlling the transmitter is included in each subscriber receiver to be scanned in synchronism with the scansion of the code record at the transmitter to produce a decoding signal. The decoding signal is utilized to actuate decoding apparatus at the receiver and effect compensating variations in the mode of operation of the receiver to decode the subscription signal and reproduce the intelligence represented thereby.

As pointed out in copending application Serial No. 254,099 filed October 31, 1951, in the name of Ellett and issued November 13, 1956 as Patent 2,770,803, entitled "Subscription Television System" and assigned to the present assignee, the coding schedule of such systems is repetitive and it is sometimes possible for an unauthorized person to examine the radiated signal and discover this schedule for use in decoding the television signal. The ease with which this may be done depends upon the length and complexity of the coding cycle. In the usual case the limitation represented by the physical size of the code record imposes such restrictions on the coding cycle that it is difficult to achieve a coding schedule sufficiently long or complex to protect adequately against unauthorized examination and utilization of the subscription signal.

The improved system disclosed in the above-mentioned Ellett application represents one solution to this problem. In that system, the coding schedule of the radiated television signal is obtained collectively from a plurality of code records each of which contains a different coding schedule. Appropriate means are provided for repeatedly scanning the individual code records, and a selecting mechanism impresses the coding signals derived from such records upon the coding apparatus. The selecting mechanism itself is actuated in accordance with a selecting schedule which determines the order in which the signals from the several code records are employed to actuate the coding apparatus. A key signal representing this selecting schedule may be disseminated to the various subscriber receivers to control a similar arrangement of several code records and an associated selecting mechanism to accomplish decoding.

In such a system the actual coding schedule of the radiated television signal is sufficiently long to render it exceedingly difficult to determine that schedule from an examination of the telecast signal. This obtains since the television signal is, in effect, coded by a sequence or combination of repeating coding schedules, and that sequence is determined by a further schedule referred to herein as a selecting schedule.

The system of the present invention is of the same general type but the timing of the selecting schedule is varied to add further to the complexity of the coding schedule of the radiated television signal. That is, instead of the selecting schedule having a fixed phase or timing relative to the coding schedules of the several code records, its phase is varied in accordance with what shall be termed a phasing schedule. In the present system, the various individual coding schedules and the selecting schedule are preferably generated locally at the subscriber receivers, while a key signal representing the phasing schedule is transmitted to such receivers concurrently with the television signal.

It is accordingly, an object of the present invention to provide an improved subscription television system in which the coding schedule of the television signal has such complexity as to render unauthorized utilizaton thereof extremely difficult if not virtually impossible.

A further object of the invention is to provide an improved subscription television system in which the coding schedule is highly complex, and yet which uses relatively simple code records.

Accordingly, the subscription television system of this invention includes a transmitter and at least one receiver. The transmitter comprises a generator for developing throughout a program interval a television signal representing a scanned subject for transmission to the receiver. A coding device is coupled to the generator for varying the mode of transmission of the television signal to effect coding thereof in accordance with an applied coding signal. The transmitter also includes means for developing a plurality of individual repetitive coding signals respectively representing different coding schedules. A selecting device is coupled to the coding-signal developing means for selectively applying the coding signals to the coding device. An actuating means operable at spaced intervals short with respect to the program interval is coupled to the selecting device for actuating this device at corresponding spaced intervals in accordance with a prescribed selecting schedule to determine the order of application of the plurality of coding signals to the coding device. And control apparatus is provided for varying the relative phase between the selecting schedule and the coding signals from time to time during the program interval in accordance with a phasing schedule.

The receiver comprises an image-reproducing device and means for receiving the television signal from the transmitter and for supplying this signal to the reproducing device. A decoding device is coupled to the circuit means for effecting compensation in the receiver for variations in mode of the television signal. The receiver also includes means for developing a plurality of individual repetitive decoding signals respectively representing the different coding schedules developed at the transmitter. A selecting device is coupled to the decoding-signal developing means for selectively applying the decoding signals to the decoding device. An actuating means operable at spaced intervals short with respect to the program interval is coupled to the selecting device for actuating this device at corresponding spaced intervals in accordance with the prescribed selecting schedule to determine the order of application of the plurality of decoding signals to the decoding device, and further means is provided for varying the relative phase of the selectng schedule and the decoding signals from time to time during the program interval in accordance with the phasing schedule.

In accordance with another aspect of the invention, a subscription television system is provided for translating a coded television signal and comprises an encoding device for varying the operating mode of the system. There is included at least one adjustable code-contributing element having a plurality of operating positions. The system has means for producing a control signal having a characteristic representing different ones of the operating positions of the code-contributing element. Means are provided for utilizing the control signal to establish the different operating positions of the element. There are means for developing an encoding signal representing a predetermined coding schedule determined at least in part by the different positions of the code-contributing element. Finally, means coupling the last-mentioned means to the encoding device are provided to effect actuation of the device effectively to encode the television signal.

Figure 2:
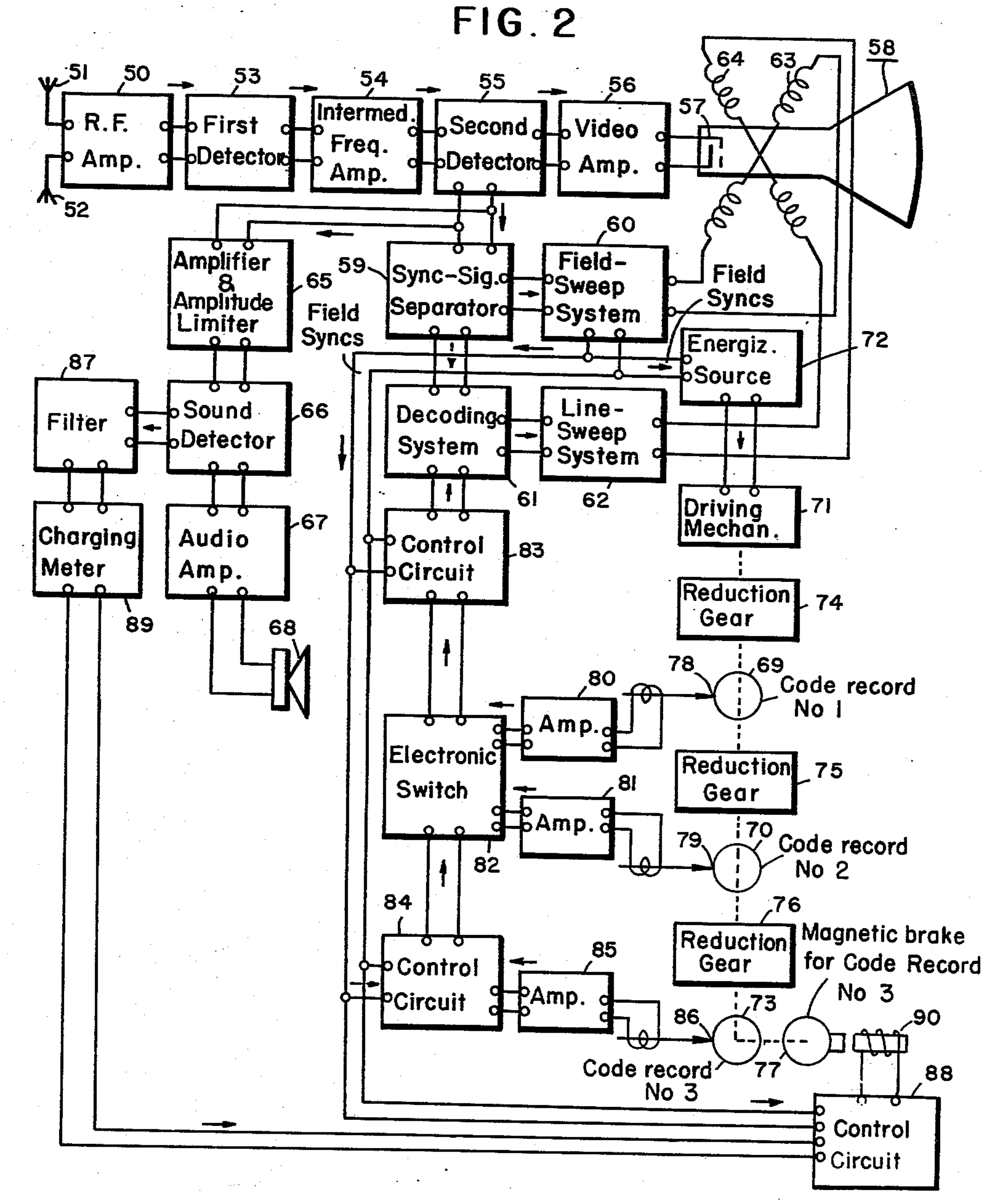

The features of this invention which are believed to be new are set forth with particularity in the appended claims. The invention itself, however, together with further objects and advantages thereof may best be understood by reference to the following description when taken in conjunction with the accompanying drawings, in which:

Figure 1 is a transmitter constructed in accordance with one embodiment of the invention, and, Figure 2 is a receiver for operation in conjunction with the transmitter of Figure 1.

The transmitter of Figure 1 includes a picture-converting device 10 which may be an iconoscope, image-orthicon, or other well-known type, for converting the shade values of a scene to be televised into a video signal for application to the input circuit of a video amplifier 11 of one or more stages. The output circuit of amplifier 11 is connected to a mixer amplifier 12 which, in turn, is connected through a direct-current inserter 13 to a carrier-wave generator and modulator 14. The output terminals of modulator 14 are connected to a diplexer 15 having output terminals coupled to an appropriate antenna circuit 16, 17.

The transmitter also includes a synchronizing- and blanking-signal generator 18 which develops line- and field-synchronizing pulses and associated blanking pedestals. Generator 18 is connected to mixer amplifier 12, to a field-sweep system 19 and through a coding system 20 to a line-sweep system 21. The output terminals of sweep systems 19 and 21 are connected respectively to the field-deflection elements 22 and line-deflection elements 23 associated with device 10.

A sound transducer or microphone 24 converts the sound intelligence associated with the televised scene into an audio signal which is applied to an audio amplifier 25 of any desired number of stages. The output terminals of amplifier 25 are connected to a carrier-wave generator and modulator 26 which, in turn, is connected through diplexer 15 to antenna 16, 17.

Generator 18 is also connected to a frequency divider 27 which may be of the random type disclosed in copending application Serial No. 32,457, filed in the name of Erwin M. Roschke on June 11, 1948, and issued March 11, 1952 as Patent 2,588,413, entitled "Random Frequency Divider" and assigned to the present assignee. The output terminals of the frequency divider are connected to an "Eccles-Jordan" multivibrator 28. That is, multivibrator 28 has two stable operating conditions and may be triggered between these conditions by successive pulses of like polarity. Multivibrator 28 is connected to a key-signal generator 29 and turns the generator on whenever the multivibrator is in a selected one of its two operating conditions. The key-signal generator is coupled to modulator 26 and impresses a burst of key signal on the modulator during operating intervals when it is turned on by the multivibrator. The frequency of the key signal is preferably outside of the audible range so that the key signal does not interfere with the audio intelligence applied to modulator 26. The output terminals of key-signal generator 29 are further connected to a control circuit 30 having other input terminals connected to generator 18 and having output terminals connected to the energizing winding of a solenoid 31.

The transmitter additionally includes at least two code records 32 and 33 which may be magnetic discs bearing code information magnetically recorded about their peripheries in the form of irregularly-spaced pulses. The duration and spacing of the pulses recorded on disc 32 represent one selected coding schedule, while the duration and spacing of the pulses recorded on disc 33 represent a distinctly different coding schedule. A further disc 34 having a magnetic brake 35 associated therewith has a further series of irregularly-spaced pulses magnetically recorded about its periphery to represent a prescribed selecting schedule. Discs 32, 33 and 34 are concurrently rotated from a common drive shaft by means of a driving mechanism 36 energized from a source 37 connected to generator 18 for synchronizing purposes. It is preferred that reduction gears 38, 39 and 40 be interposed between driving mechanism 36 and each of the discs in order that each disc may be rotated at a speed synchronized with the field scanning frequency of the system but at different sub-multiples of that frequency. Disc 34 is frictionally mounted on its drive shaft and energization of solenoid 31 causes magnetic brake 35 to arrest the rotation of this disc.

Discs 32 and 33 have pick-up heads 41 and 42 respectively associated therewith, the pick-up heads being connected to an electronic switch 43 through amplifiers 44 and 45. An additional pick-up head 46 is associated with disc 34 and is coupled through an amplifier 47 to one pair of input terminals of a control circuit 48. The control circuit has other input terminals connected to generator 18 to derive field-synchronizing pulses therefrom and has output terminals connected to electronic switch 43. The output terminals of switch 43 are connected to the input terminals of another control circuit 49 having other input terminals connected to generator 18 to derive field-synchronizing pulses therefrom and having output terminals connected to coding system 20.

As previously stated, device 10 transforms the shade values of the scene to be televised into a video signal which is amplified in video amplifier 11. The amplified signal is combined in mixer 12 with line- and field-synchronizing pulses and associated pedestals derived from generator 18 to produce a composite television signal at the output terminals of the mixer. The television signal is appropriately adjusted as to background level by D.-C. inserter 13 and, in accordance with present-day standards, is amplitude modulated on a picture carrier in unit 14 and applied to antenna circuit 16, 17 through diplexer 15. Generator 18 supplies field-synchronizing pulses to field-sweep system 19 to synchronize the field scansion of device 10. Similarly, it supplies line-synchronizing pulses to line-sweep system 21 to synchronize the line scansion of the device. However, coding system 20 which is interposed between the line-sweep system and the generator is controlled by control circuit 49 to vary, from time to time, the timing of the line-synchronizing pulses as applied to the line-sweep system. This causes a related variation in the line scansion of device 10 and a corresponding variation in the timing of the video components of the television signal developed by mixer 12 relative to its line-synchronizing components which are obtained directly from generator 18. In this manner the radiated television signal may be considered to be effectively coded since it is not susceptible of intelligent reproduction in a standard television receiver because such receivers depend upon an invariable timing between the various components of the received program signal. The sound intelligence accompanying the televised scene is converted into an audio signal by device 24 and amplified in audio amplifier 25. The amplified audio signal, in accordance with present-day standards, is frequency modulated on an appropriate sound carrier in modulator 26 and the modulated sound carrier is applied to antenna circuit 16, 17 through diplexer 15 in well-known fashion. The resulting signal radiated by the antenna includes a coded, amplitude-modulated picture carrier and a frequency-modulated sound carrier frequenecy displaced therefrom by a selected amount.

Control of coding system 20 to achieve coding of the radiated television signal is accomplished in the following manner: The rotation of magnetic discs 32 and 33 causes pick-up heads 41 and 42 to develop a pair of coding signals individually comprising a series of irregularly-timed pulses representing the recorded coding schedule of its associated disc and repeating at the scanning rate of its disc. The records on discs 32 and 33 are preferably such that when the discs are rotated at their prescribed speeds, the pulse components of the derived coding signals have a time separation representing several field periods and have a duration also corresponding to several field periods. These coding signals, after amplification in amplifiers 44 and 45, are concurrently applied to electronic switch 43 which is actuated by control circuit 48 to impress first one then the other on control circuit 49. The latter control circuit responds jointly to the applied coding-signal pulses derived from switch 43 and to field-synchronizing pulses from generator 18 to impress an actuating signal on coding system 20. The actuating signal is a series of time spaced pulses derived as follows:

The output obtained from switch 43 is a succession of pulses which are referred to as coding pulses delivered to control circuit 49. The first field-synchronizing pulse to arrive at control circuit 49 during the presence of a coding pulse initiates an actuating pulse at the output terminals of the control circuit. The first field-synchronizing pulse to arrive after the termination of the coding pulse under consideration, terminates the particular actuating pulse present at the output terminals of the control circuit. Accordingly control circuit 49 supplies time spaced actuating pulses to coding system 20.

The coding system responds to the applied actuating pulses and alters, for the duration of each such pulse, the timing of the line-synchronizing pulses as applied to the line-sweep system and, therefore, alters the relative timing between the video and line-synchronizing components of the radiated television signal for the duration of such pulses. By way of illustration, it may be assumed that coding system 20 translates line-synchronizing pulses from generator 18 to the line sweep system without any change in timing in the absence of an applied actuating pulse. It may further be considered that the coding system introduces a time-delay in the presence of an actuating pulse. It is then clear that the coding system varies the timing of the line-sweep system in accordance with a schedule represented by the actuating pulses obtained from control circuit 49. Since the pulses from this control circuit start and stop with the occurrence of field-synchronizing pulses, timing changes in the components of the television signal occur during field-retrace intervals and distortion in the television signal that could arise should such changes occur during trace intervals is precluded.

As previously stated, switch 43 determines which of the two signals from amplifiers 44 and 45 is impressed at any operating instant on control circuit 49. This switch is actuated in accordance with a pulse modulated selecting signal derived by pick up head 46 and representing the selecting schedule recorded on disc 34. The pulse components of the selecting signal are amplified in amplifier 47 and impressed on control circuit 48 which, like control circuit 49, also responds to field-synchronizing pulses derived from generator 18 so that although switch 43 is actuated during intervals determined by the selecting schedule, each of these intervals begins and ends during a field-retrace interval to eliminate distortions that could arise if the switch were to be operated during trace intervals. As previously stated, reduction gear 40 is preferably included in the arrangement so that rotation of disc 34 is slow relative to the rotation of discs 32 and 33. This enables several repetition cycles of the coding signal derived from the latter discs to be passed by switch 43 in each of its operating conditions.

In order to complicate further the coding schedule of the radiated television signal, the phase of the selecting schedule of disc 34 relative to the coding schedules of discs 32 and 33 is varied from time to time in accordance with a phasing schedule, and this is accomplished in the following manner: Field-synchronizing pulses from generator 18 are frequency-divided in divider 27 and actuate multivibrator 28 from one to the other of its stable operating conditions. The multivibrator turns on key-signal generator 29 when it is in one of its operating conditions so that bursts of key signal are impressed on control circuit 30 during spaced intervals determined by a phasing schedule established by divider 27. These bursts of key signal are rectified in control circuit 30, and constitute phase-changing pulses. The control circuit further receives field-synchronizing pulses from generator 18 and responds to both sets of pulses, in the manner described in connection with control circuit 49, to energize solenoid 31 during spaced intervals corresponding to each of the afore-mentioned phase-changing pulses but beginning and ending during field retrace periods to prevent distortion. Whenever solenoid 31 is energized it actuates brake 35 and arrests rotation of disc 34, but at the end of each interval in which the solenoid is energized, disc 34 is again free to rotate. However, when disc 34 is again free to rotate, its phase and therefore the timing of the selecting schedule recorded thereon has been altered relative to the coding schedules on discs 32 and 33 which are rotated continuously. Therefore, the timing or phase of the selecting schedule is changed from time to time relative to the coding schedules due to the energization of solenoid 31 and these changes occur in accordance with the phasing schedule. As previously pointed out, the bursts of key signal from generator 29 are modulated on the sound carrier in modulator 26 so that information concerning the phasing schedule is disseminated to subscriber receivers.

The various units of the transmitter are either extremely well known to the television art, or are described in detail in Patent 2,547,598 to Roschke, issued April 3, 1951, entitled "Subscription, Image Transmission System and Apparatus" and assigned to the present assignee. Because of this, and since the particular circuitry of these elements forms no part of the present invention, a more detailed description thereof is deemed to be unnecessary and has been omitted to simplify an understanding of the invention. It, however, may be helpful to review briefly the characteristics of units 20, 49, 48 and 30.

Unit 20 may comprise a delay line and switch having two operating conditions: one, in which a delay is introduced into the line sweep system; and another, in which the delay is removed. Unit 49 actuates this switch between its operating conditions and may be considered normally to condition the switch to delete the added delay of the delay line. However, coding pulses applied to unit 49 actuate the switch from time to time to insert the delay as determined by the schedule represented by the pulses derived from unit 49. When any such pulse arrives at unit 49, it is not effective immediately but actuates unit 20 upon the arrival of the first field-synchronizing pulse following the start of the code pulse whereupon the delay is added to the line system. The delay is continuously effective up to the end of the code pulse and to the time of the first field-synchronizing pulse following the end of the code pulse whereupon the delay is removed. Suitable counterparts of the delay type coding system and the switch operator are disclosed in the above identified Roschke patent. The operation of units 30 and 48 is essentially similar to that of unit 49.

Switch 43 may comprise two vacuum tubes feeding a common output circuit and controlled to be conductive in alternation. Control circuit 48 which is the operator for switch 43 responds jointly to pulses from amplifier 47 and to field-synchronizing pulses from generator 18. The output pulses from switch 43, taken in alternation but essentially at random from amplifiers 44 and 45, constitute the coding signal impressed on control circuit 49 to provide the coding schedule for the telecast.

The receiver of Figure 2 comprises a radio-frequency amplifier 50 of any desired number of stages having input terminals connected to an antenna circuit 51, 52 and output terminals connected to a first detector 53. The first detector is coupled to an intermediate-frequency amplifier 54 of one or more stages which, in turn, is coupled to a second detector 55. The second detector is connected through a video amplifier 56 to the input electrodes 57 of a cathode-ray image-reproducing device 58. Second detector 55 is also connected to a synchronizing-signal separator 59 which, in turn, is coupled to a field-sweep system 60 and through a decoding system 61 to a line-sweep system 62. The output terminals of sweep systems 60, 62 are connected respectively to the field-deflection elements 63 and line-deflection elements 64 associated with device 58. Second detector 55 is also coupled to a sound amplifier and amplitude-limiter 65 which is coupled through a sound detector 66 and audio amplifier 67 to a sound-reproducing device 68.

The receiver further comprises a pair of magnetic discs 69 and 70 respectively bearing code patterns identical to those of discs 32 and 33 at the transmitter. Discs 69 and 70 are rotated by a drive mechanism 71 which is energized by a suitable energizing source 72 coupled to field-sweep system 60 for synchronizing purposes. A further disc 73 having a selecting pattern recorded thereon identical to the pattern of disc 34 at the transmitter is driven together with discs 69 and 70 from a common drive shaft and drive mechanism 71 for concurrent rotation. Reduction gears 74, 75 and 76 are interposed between the discs and the drive mechanism having selected reduction ratios so that the discs rotate at speeds identical to the speeds of the corresponding discs at the transmitter. Disc 73, like disc 34 at the transmitter, is frictionally mounted on the drive shaft and may be arrested by a magnetic brake 77 associated therewith.

Discs 69 and 70 respectively have pick-up heads 78, 79 associated therewith, the pick up heads being connected to amplifiers 80 and 81. The output terminals of amplifiers 80 and 81 are connected to an electronic switch 82 which, in turn, is connected to a control circuit 83. Control circuit 83 has input terminals connected to field-sweep system 60 to derive field-synchronizing pulses therefrom and output terminals connected to decoding system 61. Electronic switch 82 is actuated by a control circuit 84 connected to field-sweep system 60 and further connected to the output terminals of amplifier 85, the input terminals of this amplifier being coupled to a pick-up head 86 associated with disc 73.

A filter circuit 87 is connected to sound detector 66 to select the aforementioned key-signal bursts, and the output terminals of this filter are connected to a control circuit 88 through a charging meter 89. Control circuit 88 has input terminals connected to field-sweep system 60 to derive field-synchronizing pulses and has output terminals coupled to a solenoid 90 associated with magnetic brake 77.

The receiver may be tuned to utilize a subscription telecast from the transmitter of Figure 1. The radiated signal is intercepted by antenna 51, 52 and amplified in radio-frequency amplifier 50. The amplified signal is heterodyned to the selected intermediate frequency of the receiver in first detector 53, and the resulting intermediate-frequency signal is amplified in intermediate-frequency amplifier 54 and detected in second detector 55. The composite video signal from the second detector is amplified in video amplifier 56 and is then applied to the input electrodes 57 of reproducing device 58 to control the intensity of the cathode-ray beam thereof in accordance with the image intelligence.

The synchronizing components of the incoming television signal are separated out in separator 59, which applies field-synchronizing pulses to field-sweep system 60 and line-synchronizing pulses through decoding system 61 to line-sweep system 62. In this manner, the sweep systems and, therefore, the line- and field-scansions of reproducing device 58 are synchronized with the incoming signal. Decoding system 61 is actuated in a manner to be described to impart compensating variations in the timing of the line-synchronizing pulses applied to line-sweep system 62 so that the aforementioned variations in timing between the video and line-synchronizing components of the television signal may be corrected to enable device 58 to reproduce properly the picture intelligence.

In accordance with intercarrier-sound principles, detector 55 develops an intercarrier signal frequency- modulated with the sound intelligence. The intercarrier signal is selected by means of an appropriate selecting network and applied to unit 65 wherein it is amplified and amplitude limited. The signal is then detected in circuit 66, amplified in audio amplifier 67 and the sound intelligence reproduced in device 68. The aforementioned bursts of key signal representing the phasing schedule of the system also appear as modulation components of the intercarrier signal and are selected by filter 87.

As previously pointed out, discs 69 and 70 respectively have code information recorded thereon identical to the code information of discs 32 and 33 at the transmitter. The receiver discs are driven in synchronism with the transmitter discs by drive mechanism 71 due to the synchronization of energizing source 72 by field-synchronizing pulses derived from field-sweep system 60. Initial phasing of discs 69 and 70 and the transmitter discs may be accomplished by any known means, for example, the arrangement disclosed in copending application Serial No. 75,988, filed February 12, 1949, and issued October 20, 1953 as Patent 2,656,407, in the name of Roswell H. Herrick et al. entitled "Subscriber Signalling System" and assigned to the present assignee, may be used to advantage. Pick-up heads 78 and 79 produce decoding signals having identical characteristics to the corresponding coding signals at the transmitter and the decoding signals are amplified in amplifiers 80 and 81 and applied to switch 82. Likewise, pick-up head 86 produces a selecting signal having identical characteristics to the corresponding selecting signal at the transmitter, this signal being amplified in amplifier 85 and applied to control circuit 84. Moreover, the timing of the selecting schedule of disc 73 relative to the coding schedules of discs 69 and 70 is altered in correspondence with similar alterations at the transmitter, during spaced intervals due to the action of brake 77 and solenoid 90. The solenoid is energized at the same intervals as solenoid 31 at the transmitter by control circuit 88 which responds to the bursts of key signal and to the field-synchronizing pulses from sweep system 60. The charging meter 89 is introduced between filter 87 and control circuit 88 to determine the time of use of the key signal by the subscriber so that a suitable charge may be assessed for the subscription service.

Control circuit 84 responds to the signal from amplifier 85 and to the field-synchronizing pulses derived from field-sweep system 60 to actuate switch 82 in time coincidence with the actuation of switch 43 at the transmitter. In this manner, the signal applied to control circuit 83 by switch 82 is identical to the control signal applied to control circuit 49 at the transmitter. Control circuit 83 responds to the signal from switch 82 and to field-synchronizing pulses derived from field-sweep system 60 to actuate decoding system 61 in time coincidence with the actuation of coding system 20 at the transmitter. Therefore, the line-synchronizing pulses applied to line-sweep system 62 are delayed an appropriate amount and at the proper times by decoding system 61 so that the timing of the line scansion of device 58 is varied to compensate the afore-described variations in the television signal.

The various units of the receiver, with the exception of decoding system 61 and control circuits 83, 84 and 88, are in themselves extremely well-known to the art, and for this reason a detailed explanation of the circuitry thereof is believed to be unnecessary. The decoding system 61 and control circuits 83, 84 and 88 may be similar in construction to the corresponding portions of the transmitter and are described in detail in the aforesaid Patent 2,547,598 to Roschke.

While a particular embodiment of the invention has been shown and described, modifications may be made, and it is intended in the appended claims to cover all such modifications as may fall within the true spirit and scope of the invention.

I claim:

1. A subscription television transmitter comprising: a generator for developing throughout a program interval a television signal representing a scanned subject for transmission to subscriber receivers; a coding device coupled to said generator for varying the mode of transmission of said television signal to effect coding thereof in accordance with an applied coding signal; means for developing a plurality of individual repetitive coding signals respectively representing different coding schedules; a selecting device for selectively applying said coding signals to said coding device; means operable at spaced intervals short with respect to said program interval for actuating said selecting device at corresponding spaced intervals in accordance with a repetitive selecting schedule to determine the order of application of said plurality of coding signals to said coding device; and control apparatus for varying the relative phase between said selecting schedule and said coding signals from time to time during said program interval in accordance with a phasing schedule.

2. A subscription television transmitter comprising: a generator for developing throughout a program interval a television signal representing a scanned subject for transmission to subscriber receivers; a coding device coupled to said generator for varying the mode of transmission of said television signal to effect coding thereof in accordance with an applied coding signal; means for developing a plurality of individual repetitive coding signals respectively representing different coding schedules; a selecting device for selectively applying said coding signals to said coding device; means operable at spaced intervals short with respect to said program interval for actuating said selecting device at corresponding spaced intervals in accordance with a repetitive selecting schedule to determine the order of application of said plurality of coding signals to said coding device; control apparatus responsive to an applied key signal for varying the relative phase between said selecting schedule and said coding signals from time to time during said program interval in accordance with a phasing schedule; means for developing a key signal representing said phasing schedule for application to said control apparatus; and means for distributing said key signal to said subscriber receivers.

3. A subscription television transmitter comprising: a generator for developing throughout a program interval a television signal representing a scanned subject for transmission to subscriber receivers; a coding device coupled to said generator for varying the mode of transmission of said television signal to effect coding thereof in accordance with an applied coding signal; means for developing a plurality of individual repetititve coding signals respectively representing different coding schedules; a selecting device coupled to said developing means for selectively applying said coding signals to said coding device; means for developing during said program interval a series of selecting pulses representing a series of spaced intervals short with respect to said program interval according to a selecting schedule and recurring at a low rate relative to the repetition cycle of said coding signals; an actuating circuit coupled to said selecting-signal developing means and responsive to said selecting pulses for actuating said selecting device at corresponding spaced intervals to determine the order of application of said plurality of coding signals to said coding device; and control apparatus coupled to said selecting-signal developing means for varying the phase of said selecting signal as compared with said coding signals from time to time during said program interval in accordance with a phasing schedule.

4. A subscription television transmitter comprising: a generator for developing throughout a program interval a television signal representing a scanned subject for transmission to subscriber receivers; a coding device coupled to said generator for varying the mode of transmission of said television signal to effect coding thereof; a signal-storage device having a selected code schedule stored therein; means for effecting recurrent scansion of said storage device to develop a coding signal having repeating characteristics established by said code schedule; means responsive to said coding signal for actuating said coding device; control apparatus coupled to said signal-storage device responsive to an applied control signal for varying the time-phase characteristic of said code schedule to alter the timing of said coding signal; and a signal source for supplying to said control apparatus a control signal representing a phasing schedule to effect actuation of said control apparatus from time to time during said program interval.

5. A subscription television transmitter comprising: a generator for developing throughout a program interval a television signal representing a scanned subject for transmission to subscriber receivers; a coding device coupled to said generator for varying the mode of transmission of said television signal to effect coding thereof; a signal-storage device having a selected code schedule stored therein; means for effecting recurrent scansion of said storage device to develop a coding signal having repeating characteristics established by said code schedule; means responsive to said coding signal for actuating said coding device; and control apparatus coupled to said signal-storage device for interrupting the recurrent scansion of said storage device to vary the time-phase characteristic of said code schedule from time to time in accordance with a phasing schedule during said program interval.

6. A subscription type of television receiver for utilizing throughout a program interval a coded television signal having its mode of transmission varied selectively in accordance with a plurality of difficult repetitive coding schedules selected in accordance with a repetitive selecting schedule, the relative timing of said selecting schedule and said coding schedules being varied in accordance with a phasing schedule, said receiver comprising: an image-reproducing device; circuit means for supplying said television signal to said reproducing device; a decoding device coupled to said circuit means for effecting compensation in said receiver for the variations in mode of said television signal; means for developing a plurality of individual repetitive decoding signals respectively representing said plurality of coding schedules; a selecting device for selectively applying said decoding signals to said decoding device; means operable at spaced intervals short with respect to said program interval for actuating said selecting device at corresponding spaced intervals in accordance with said selecting schedule to determine the order of application of said plurality of decoding signals to said decoding device; and control apparatus for varying the relative timing of said selecting schedule and said decoding signals from time to time during said program interval in accordance with said phasing schedule.

7. A subscription type of television receiver for utilizing throughout a program interval a coded television signal having its mode of transmission varied selectively in accordance with a plurality of different repetitive coding schedules selected in accordance with a repetitive selecting schedule, the relative timing of said selecting schedule and said coding schedules being varied in accordance with a phasing schedule, and for utilizing a key signal representing said phasing schedule, said receiver comprising: an image-reproducing device; circuit means for supplying said television signal to said reproducing device; a decoding device coupled to said circuit means for effecting compensation in said receiver for variations in mode of said television signal; a decoding-signal source for developing a plurality of individual repetitive decoding signals respectively representing said plurality of coding schedules; a selecting device coupled to said source for selectively applying said decoding signals to said decoding device; an actuating device responsive to an applied selecting signal for controlling said selecting device; a selecting-signal source for supplying a selecting signal representing said selecting schedule to said actuating device to determine the order of application of said plurality of decoding signals to said decoding device during said program interval; control apparatus coupled to one of said sources responsive to an applied signal for varying the relative timing of said selecting signal and said decoding signals; and means for utilizing said key signal for developing a control signal representing said phasing schedule for application to said control apparatus to effect actuation of said control apparatus from time to time during said program interval.

8. A subscription type of television receiver for utilizing throughout a program interval a coded television signal having its mode of transmission varied in accordance with a repeating coding schedule the timing of which is varied in accordance with a phasing schedule, said receiver comprising: an image-reproducing device; circuit means for supplying said television signal to said reproducing device; a decoding device coupled to said circuit means responsive to an applied decoding signal for effecting compensation in said receiver for variations in mode of said television signal; a signal-storage device for developing a decoding signal representing said repeating coding schedule and for applying said decoding signal to said decoding device; control apparatus coupled to said signal-storage device responsive to an applied control signal for controlling said storage device to vary the timing of said decoding signal; and a signal source for supplying to said control apparatus a control signal representing said phasing schedule to effect actuation of said control apparatus from time to time during said program interval.

9. A subscription type of television receiver for utilizing throughout a program interval a coded television signal having its mode of transmission varied in accordance with a repeating coding schedule the timing of which is varied in accordance with a phasing schedule, said receiver comprising: an image-reproducing device; circuit means for supplying said television signal to said reproducing device; a decoding device coupled to said circuit means responsive to an applied decoding signal for effecting compensation in said receiver for variations in mode of said television signal; a signal-storage device having said coding schedule stored therein; scanning apparatus for recurrently scanning said storage device to develop a decoding signal having repeating characteristics established by said coding schedule; means for applying said decoding signal to said decoding device; control apparatus coupled to said storage device responsive to an applied signal for controlling the phase of said scanning apparatus and said coding schedule to vary the timing of said decoding signal; and means for developing a control signal representing said phasing schedule and for applying said control signal to said control apparatus to effect actuation of said control apparatus from time to time during said program interval.

10. A subscription television system comprising: a television-signal translating apparatus; a device coupled to said apparatus for varying the mode of translation of a television signal thereby throughout a program interval in accordance with an applied mode-changing signal; means for developing a plurality of individual repetitive mode-changing signals respectively representing different mode-changing schedules; a selecting device for selectively applying said mode-changing signals to said first-mentioned device; means operable at spaced intervals short with respect to said program interval for actuating said selecting device at corresponding spaced intervals in accordance with a repetitive selecting schedule to determine the order of application of said mode-changing signals to said first mentioned device; and control apparatus for varying the relative phase between said selecting schedule and said mode-changing signals from time to time during said program interval in accordance with a phasing schedule.

11. A subscription television system comprising: a television-signal translating apparatus; a device coupled to said apparatus for varying the mode of translation of a television signal thereby throughout a program interval in accordance with an applied mode-changing signal; a signal-storage device having a selected mode-changing schedule scored therein; means for effecting recurrent scansion of said storage device to develop a mode-changing signal having repeating characteristics established by said mode-changing schedule; means responsive to said mode-changing signal for actuating said mode-varying device; control apparatus coupled to said signal-storage device responsive to an applied control signal for varying the time-phase characteristic of said mode-changing schedule; and a signal source for supplying a control signal to said control apparatus to effect actuation of said control apparatus from time to time in accordance with a phasing schedule represented by said control signal during said program interval.

12. Mode-changing apparatus for use in a subscription television system comprising: means for developing throughout a program interval a plurality of individual repetitive mode-changing signals respectively representing different mode-changing schedules; a selecting device for selectively applying said mode-changing signals to said system; means operable at spaced intervals short with respect to said program interval for actuating said selecting device at corresponding spaced intervals in accordance with a repetitive selecting schedule to determine the order of application of said mode-changing signals to said system; and control apparatus for varying the relative phase between said mode-changing signals and said selecting schedule from time to time during said program interval in accordance with a phasing schedule.

13. An actuating system for encoding apparatus of a subscription television system comprising: means for developing throughout a program interval a plurality of individual repetitive encoding signals respectively representing different coding schedules; a selecting device for selectively applying said encoding signals to said encoding apparatus; means operable at spaced intervals short with respect to said program interval for actuating said selecting device at corresponding spaced intervals in accordance with a selecting schedule to determine the order of application of said encoding signals to said encoding apparatus; and control apparatus for interrupting said selecting schedule from time to time in accordance with a phasing schedule during said program interval.

14. A subscription television system for translating a coded television signal comprising: an encoding device for varying the operating mode of said system; at least one adjustable code-contributing element having a plurality of operating positions; means for producing a control signal having a characteristic representing different ones of said operating positions of said code-contributing element; means for utilizing said control signal to establish said different operating positions of said element; means for developing an encoding signal representing a predetermined coding schedule determined at least in part by said different positions of said code-contributing element; and means coupling said last-mentioned means to said encoding device to effect actuation of said device effectively to encode said television signal.

15. A subscription television receiver for utilizing a coded television signal and also an air-borne control signal having a predetermined characteristic comprising: a decoding device for varying the operating mode of said receiver; at least one adjustable code-contributing element having a plurality of operating positions; means for utilizing said control signal to establish different ones of said operating positions of said element as represented by said predetermined characteristic; means for developing a decoding signal representing a predetermined coding schedule determined at least in part by said different positions of said code-contributing element; and means coupling said last-mentioned means to said decoding device to effect actuation of said device effectively to decode said television signal.

References Cited in the file of this patent

UNITED STATES PATENTS

| | | |
|---|---|---|
| 2,251,525 | Rosenthal | Aug. 5, 1941 |
| 2,402,058 | Loughren | June 11, 1946 |
| 2,545,770 | Ellett et al. | Mar. 20, 1951 |
| 2,573,349 | Miller et al. | Oct. 30, 1951 |
| 2,649,498 | Ellett | Aug. 18, 1953 |
| 2,656,407 | Herrick et al. | Oct. 20, 1953 |